Patented Dec. 8, 1942

2,304,100

UNITED STATES PATENT OFFICE 2,304,100

PREPARATION OF TERTIARY CARBINOLS OF THE CYCLOPENTANOPHENANTHRENE SERIES

Percy L. Julian, Maywood, and John Wayne Cole and Peter John Carr, Chicago, Ill., assignors to The Glidden Company, Cleveland, Ohio, a corporation of Ohio No Drawing. Application April 16, 1941,
Serial No. 388,898

13 Claims. (Cl. 260—397.5)

The present invention relates to degradation of acids of the type of bile acids and acids secured by oxidative degradation of sterols, and more particularly relates to an improved method for the degradation of such acids and certain products produced thereby.

The classical method for clean and unequivocal degradation of bile acids, or acids secured by oxidative degradation of sterols, is the so-called "Barbier-Wieland degradation" (Gilman, "Organic Chemistry," volume II, p. 1240, John Wiley and Sons, New York (1938). This method is well described and illustrated by Wieland, Schlicting and Jacobi (Z. Physiol. Chem. 161, 80 (1926)) and comprises the following steps:

1. Esterification of the acids, usually with diazomethane.
2. Conversion of the ester, resulting from Step 1, with the Grignard reagent into the corresponding tertiary carbinol.
3. Oxidation of the resulting carbinol, or the ethylene formed by removal of the elements of water, with chromic anhydride or ozone respectively.

The following equations illustrate the steps:

Step 1

$$R-\overset{CH_3}{\underset{|}{C}H}-(CH_2)_n COOH \xrightarrow{CH_2N_2} R-\overset{CH_3}{\underset{|}{C}H}(CH_2)_n-COOCH_3$$

Step 2

$$R-\overset{CH_3}{\underset{|}{C}H}-(CH_2)_nCOOCH_3 \xrightarrow{R'MgX} R-\overset{CH_3}{\underset{|}{C}H}(CH_2)_n-\overset{C(R')_2}{\underset{|}{OMgX}}$$

$$R-\overset{CH_3}{\underset{|}{C}H}-(CH_2)_n-\overset{C-(R')_2}{\underset{|}{OMgX}} \xrightarrow{+H_2O} R-\overset{CH_3}{\underset{|}{C}H}(CH_2)_n-\overset{C(R')_2}{\underset{|}{OH}}$$

Step 3

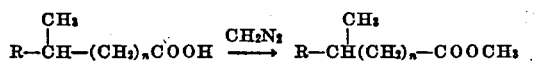

or

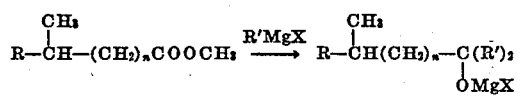

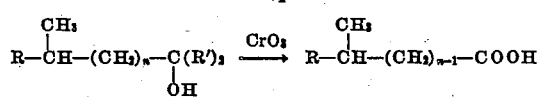

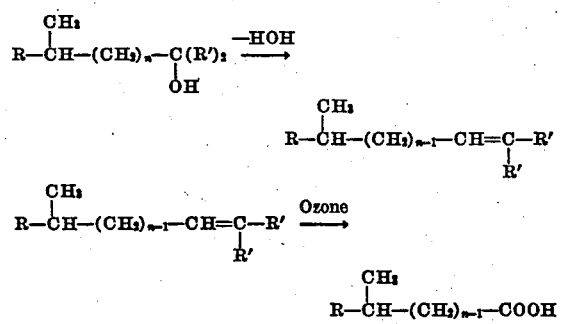

In the above equations R represents a cyclopentanophenanthrene nucleus found in the bile acids or sterols, while R' represents a hydrocarbon radical, and $n$ may be zero or a positive integer usually not greater than two. Where $n$ is zero, the final product resulting from ozonization is a ketone, and Step 3 as written above must be modified to show formation of a ketone or more extended possible degradation through oxidation with chromic anhydride. When $n$ is a positive integer, the resulting acid, such as from Step 3 above, and namely

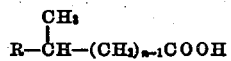

may be further degraded to

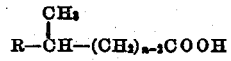

in similar fashion as indicated in the three equations above. Such degradations in the case of certain acids result in valuable intermediates for the synthesis of certain of the sex hormones.

This esterification with diazo-methane is at best a costly and time-consuming procedure. This esterification also presents a definite handicap in that diazo-methane is poisonous and explosive and can only be prepared with safety in relatively small quantities. Moreover it cannot be stored for any extended period but must be used immediately. Esterification in certain cases has been carried out with methyl alcoholic hydrogen halide. This method, however, has not been widely employed, probably because it is not as clean and as economical as desirable when using such valuable material as the acids in question.

It is accordingly an object of the present invention to provide a simpler method than heretofore for the degradation of acids of the type of bile acids and the acids secured by oxidative degradation of sterols.

A specific object of the invention is to avoid Step 1 set forth in the above set of equations.

A further object is to provide a new method for preparing intermediates useful in the synthesis of certain sex hormones.

It has been found that it is not necessary to esterify the acid before treatment with the Grignard reagent. Indeed the free acids may be added directly to a solution of the appropriate Grignard reagent and the reaction proceeds smoothly. This has not been hitherto recorded in the literature, and the reasons therefore probably lie first in the warranted assumption that acids like 3-hydroxy-bisnorcholenic, 3-hydroxy-cholenic, 3-hydroxy-norcholenic and cholic acids are too insoluble in Grignard solvents for such a treatment. Secondly, it has probably been assumed that since the sodium and potassium salts of these acids are so insoluble in most organic solvents, the magnesium-bromo, magnesium-chloro, or magnesium-iodo-salts would be even more insoluble and would precipitate out when the acids were added to a solution of the Grignard reagent, giving rise to two-phase systems which would greatly retard reaction. Surprisingly enough neither of these assumptions holds, and the acids react rapidly enough with a concentrated solution of the Grignard reagent to go into solution readily. Of the four acids mentioned above, cholic acid, containing the largest number of active hydrogen atoms, goes into solution more readily than any of the others when added to a solution of the Grignard reagent.

This invention makes more feasible the degradation of fairly readily accessible 3-hydroxy-cholenic acid to the more difficultly accessible 3-hydroxy-bisnorcholenic acid. The former acid can be obtained fairly readily by the oxidation of cholesterol, while the latter acid is usually prepared from the much less readily available sterol, Stigmasterol, by the method of Fernholz (Annalen 507, 128 (1933)). Avoidance of two esterification steps greatly simplifies this degradation.

During the course of these experiments we have also prepared $\Delta^5$-3-hydroxy-ternorcholenyl-dimethyl-carbinol which is described here for the first time and which we have found to possess certain advantageous properties in connection with the problem of degrading bile acids and acids secured by the oxidative degradation of sterols.

The following examples of detailed preparations illustrate the invention, but the invention is not necessarily limited to these examples.

Example 1

To a Grignard solution prepared from 60 grams of magnesium, 400 grams of bromo-benzene and one liter of anhydrous ether, 63 grams of $\Delta^5$-3-hydroxy-bisnorcholenic acid (M. P. 292°) is added portionwise. The acid is preferably ground in a mortar to about 300 mesh before the addition, and with this material about 15 minutes are required for the addition. After all acid has been added, 500 cc. of toluene is added, the ether distilled off, and the residual mixture heated on a boiling water bath for three hours.

The mixture was then cooled and carefully poured with stirring into a solution of approximately two pounds of ice and 200 cc. of concentrated sulfuric acid. The resulting carbinol, diphenyl $\Delta^5$-3-hydroxy-ternorcholenyl - carbinol, was extracted with 300 cc. of ether, the ethereal solution washed well with water and later with a 10% solution of sodium hydroxide to remove any unreacted acid, of which about 2 grams were recovered in this way.

The ether was distilled off from the carbinol and the residue steam distilled for three hours. The carbinol, a straw colored crystalline solid, was extracted with ether, washed well with water and concentrated to a volume of about 150 cc. On cooling the mixture 40 grams of colorless crystals of diphenyl ($\Delta^5$-3-hydroxy-ternorcholenyl)-carbinol melting at 117–120° C. was obtained. The mother liquor was freed from ether and 100 cc. of acetone added, whereupon 15 grams more, melting at 112–118° was obtained. The mother liquor from these latter crystals was concentrated to a volume of about 50 cc., about 150 cc. of petroleum ether added, and the mixture was allowed to stand for 12 hours in the cold; 3 grams more melting at 108–115° was obtained. The total yield was 58 grams, or 66% of the theoretical. On recrystallizing, the carbinol melted at 112° as indicated by Reichstein and Steiger Helv. Chim. Acta 20, 1045 (1937)). Analyses and conversion into known derivatives demonstrated the identity of the product.

Example 2

Preparation of dimethyl-$\Delta^5$-3-hydroxy-ternorcholenyl-carbinol

To a Grignard solution prepared from 55 grams of magnesium, 246.5 grams of methyl bromide and 1400 cc. of anhydrous ether, 58 grams of $\Delta^5$-3 - hydroxy - bisnorcholenic acid (M. P. 292°) was added portionwise over a period of about 15 minutes. Then 500 cc. of dry toluene was added, the ether distilled off and the residual mixture heated on the water bath for about 6 hours.

The product was decomposed by pouring with stirring onto a mixture of about four pounds of ice and 200 cc. of concentrated sulphuric acid. The mixture was then extracted with benzene, filtered to remove unchanged acid, and concentrated under partial vacuum to a volume of about 300 cc. On allowing this solution to stand, 26 grams of crystalline $\Delta^5$-3-hydroxy-ternorcholenyl carbinol, melting at 185–192° was obtained. About four to five grams more could be obtained pure from the mother liquor. The yield was about 51% of the theoretical. On recrystallization from acetone the carbinol melted at 194°.

Example 3

Preparation of norcholyl-dimethyl-carbinol

To a Grignard reagent prepared from 2 grams of magnesium turnings, 15 grams of methyl iodide, and 200 cc. ether, was added 2.0 grams of powdered cholic acid (M. P. 197–198°) and 30 cc. of toluene. Nearly all of the ether was distilled, and the residual solution was heated over a steam bath for 10 hours. The resulting solution was stirred into ice and ammonium chloride and the organic material extracted with several portions of benzene. The benzene solution was washed successively with water, dilute sodium carbonate and water. Practically no organic acids were extracted by the sodium carbonate. The benzene and toluene were removed by steam distillation, leaving about 2 grams of a clear, waxy product insoluble in ether. Concentration of its acetone solution in the cold gave crystals of norcholyl dimethyl - carbinol hydrate which melted at 121–123°, then resolidified to melt again at 179–183°.

Example 4

Preparation of $\Delta^5$-3-hydroxy-nor-cholenyl-diphenyl-carbinol

To a Grignard reagent prepared from 9 grams of magnesium turnings and 42 cc. of bromo-benzene in 300 cc. absolute ether, was added 5.0 grams powdered $\Delta^5$-3-hydroxy-cholenic acid (M. P. 230–232° C.) and 100 cc. toluene. The ether was distilled and the residue heated over a steam bath for 8 hours. The product was poured onto ice and ammonium chloride, and the organic material extracted with ether. The ether solution was filtered to remove 0.2 gram insoluble acid, then washed successively with water, sodium hydroxide and several times with water. No organic acid was precipitated by acidifying the sodium hydroxide extract. The neutral product was steam distilled to remove toluene and biphenyl, and the residual waxy product (5.0 g.) was taken up in benzene, then filtered through a 40 gram column of activated alumina which adsorbed the principal product. After being washed with pentane, the alumina was extracted with acetone. The acetone concentrate, when treated with a few cc. of methanol, crystallized in colorless needles of Δ⁵-3-hydroxy-nor-cholenyl-diphenyl-carbinol, melting at 104–105°.

When a sample of this carbinol was refluxed for 45 minutes with a mixture containing 75% glacial acetic acid and 25% acetic anhydride, and the material cooled. Prisms of Δ⁵-3-acetoxy-bisnorcholenyl-diphenyl-ethylene, having a melting point of about 155°, were formed.

Having described the invention what is claimed is:

1. The process for preparing tertiary carbinols which comprises subjecting a free acid, without alteration of the carboxyl group, containing a cyclopentano hydrophenanthrene nucleus being of the class consisting of bile acids and acids secured by the oxidative degradation of sterols, said acids being further characterized in that a hydroxy group is attached to the number 3 carbon atom of the cyclopentano hydrophenanthrene nucleus, to the action of a Grignard reagent, and hydrolyzing the resulting magnesium compound to yield the corresponding free tertiary carbinol.

2. The process for preparing an intermediate in the degradation of Δ⁵-3-hydroxy-bisnorcholenic acid, which comprises subjecting the free acid, without alteration of the carboxyl group, to the action of a Grignard reagent, and hydrolyzing the resulting magnesium derivative to yield the corresponding free carbinol.

3. The process for preparing Δ⁵-3-hydroxy ternorcholenyl-diphenyl carbinol which comprises subjecting free Δ⁵-3-hydroxy-bisnor-cholenic acid, without alteration of the carboxyl group, to the action of a solution of phenyl magnesium bromide, and hydrolyzing the resulting magnesium derivative to yield the corresponding free carbinol.

4. The process for preparing Δ⁵-3-hydroxy-ternor-cholenyl-dimethyl-carbinol which comprises subjecting free Δ⁵-3-hydroxy-bisnor-cholenic acid, without alteration of the carboxyl group, to the action of a solution of a methyl-magnesium halide, and hydrolyzing the resulting magnesium derivative to yield the free carbinol.

5. The process for preparing norcholyl-dimethyl-carbinol which comprises subjecting free cholic acid, without alteration of the carboxyl group, to the action of a methyl-magnesium halide, and hydrolyzing the resulting magnesium derivative to yield the tertiary carbinol.

6. The process for preparing a tertiary carbinol, which comprises subjecting the free cholic acid, without alteration of the carboxy group, to the action of a Grignard reagent, and hydrolyzing the resulting magnesium derivative to yield the corresponding free carbinol.

7. The process for preparing a tertiary carbinol, which comprises subjecting free Δ⁵-3-hydroxy-cholenic acid, without alteration of the carboxyl group, to the action of a Grignard reagent and hydrolyzing the resulting magnesium derivative to yield the corresponding tertiary carbinol.

8. The process which comprises subjecting a free acid, without alteration of the carboxyl group, of the formula

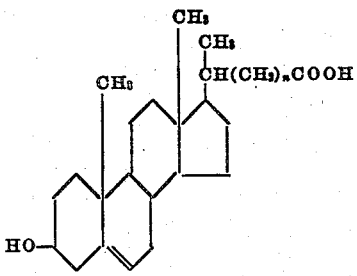

in which $n$ is zero, 1 or 2, to the action of a Grignard reagent, and hydrolyzing the resulting magnesium derivative to yield the corresponding tertiary carbinol.

9. The process which comprises subjecting a free acid, without alteration of the carboxyl group, of the formula

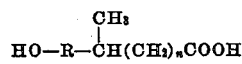

in which R represents a radical containing the cyclopentano phenanthrene nucleus attached to the side chain through the 17 carbon atom, and $n$ is zero, 1 or 2, to the action of a Grignard reagent, and hydrolyzing the resulting magnesium compound to yield the corresponding free tertiary carbinol.

10. In the process of preparing Δ⁵-3-hydroxy-norcholenic acid the steps comprising subjecting free Δ⁵-3-hydroxy-cholenic acid, without alteration of the carboxyl group, to the action of a Grignard reagent, hydrolyzing the resulting magnesium derivative to form the corresponding free tertiary carbinol, removing the elements of water from the free carbinol, and oxidizing the so-formed ethylene to the corresponding nor-cholenic acid.

11. The process of degrading an acid of the formula

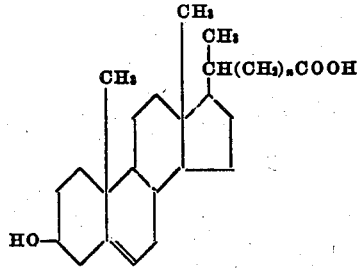

in which $n$ is zero, 1 or 2, which comprises subjecting the free acid, without alteration of the carboxyl group, to the action of a Grignard reagent, hydrolyzing the resulting magnesium derivative to form the corresponding free carbinol, removing the elements of water from the carbinol and oxidizing the so-formed ethylene at the ethyleneic linkage.

12. The process of preparing tertiary carbinols which comprises subjecting a free acid, without alteration of the carboxyl group, secured by oxidative degradation of sterols to the action of a Grignard reagent, and hydrolyzing the resulting magnesium compound to yield the corresponding tertiary carbinol.

13. The process of preparing tertiary carbinols which comprises subjecting a free bile acid, without alteration of the carboxyl group, containing a cyclopentano-hydrophenanthrene nucleus to the action of a Grignard reagent and hydrolyzing the resulting magnesium compound to yield the corresponding tertiary carbinol.

PERCY L. JULIAN.
JOHN WAYNE COLE.
PETER JOHN CARR.